(12) United States Patent
Ishii et al.

(10) Patent No.: US 7,552,011 B2
(45) Date of Patent: Jun. 23, 2009

(54) MAP DISPLAY APPARATUS AND MAP DISPLAY METHOD

(75) Inventors: Keisuke Ishii, Saitama (JP); Kenji Nagashima, Kanagawa (JP); Yuichi Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 11/320,642

(22) Filed: Dec. 30, 2005

(65) Prior Publication Data
US 2006/0167629 A1    Jul. 27, 2006

(30) Foreign Application Priority Data
Jan. 19, 2005    (JP) ............... 2005-012036

(51) Int. Cl.
G08G 1/123    (2006.01)
G01C 21/00    (2006.01)

(52) U.S. Cl. .............. 701/213; 340/995.1; 701/211; 701/212

(58) Field of Classification Search ............ 340/995.1, 340/995.11, 995.12, 995.14, 995.15, 995.17, 340/995.19, 995.24, 995.26, 995.27, 995.28; 701/211, 212, 213, 208
See application file for complete search history.

(56) References Cited

U.S. PATENT DOCUMENTS 5,821,880 A * 10/1998 Morimoto et al. ...... 340/995.21
6,012,014 A * 1/2000 Koyanagi et al. ........... 701/208
2004/0080434 A1 * 4/2004 Watanabe et al. ......... 340/995.1

FOREIGN PATENT DOCUMENTS

| JP | 7-270172 | 10/1995 |
| JP | 1997-303325 A * | 10/1997 |
| JP | 11-120335 | 4/1999 |
| JP | 2001-33258 | 2/2001 |
| JP | 2003-156344 | 5/2003 |
| JP | 2003-242152 | 8/2003 |

OTHER PUBLICATIONS

JP 1997303325 A Translation.*

* cited by examiner

Primary Examiner—Thomas G Black
Assistant Examiner—Ce Li
(74) Attorney, Agent, or Firm—Oblon, Spivak, McClelland, Maier & Neustadt, P.C.

(57) ABSTRACT

A map display apparatus is provided to allow a user to easily find out destinations on maps without forcing him/her to perform troublesome operations. An apparatus displays a main map image showing a current position at substantially a center of a screen. The apparatus also disposes a plurality of map images around the main map image in thumbnail format such that each map image corresponds to each direction on the main map image. In this manner, the apparatus provides the user with information about wider area than the main map image by showing him/her the thumbnails, which are disposed around the main map image such that each thumbnail corresponds to each direction on the main map image That allows the user to easily find out destinations on maps without forcing him/her to perform troublesome operations.

10 Claims, 5 Drawing Sheets

MAP DISPLAY APPARATUS AND MAP DISPLAY METHOD

CROSS REFERENCES TO RELATED APPLICATIONS

The present invention contains subject matter related to Japanese Patent Application JP2005-012036 filed in the Japanese Patent Office on Jan. 19, 2005, the entire contents of which being incorporated herein by reference.

BACKGROUND OF THE INVENTION

1. Field of the Invention

The preset invention relates to a map display apparatus and map display method, and is preferably applied to a vehicle navigation apparatus, for example.

2. Description of the Related Art

In late years, map provision sites have been published on the Internet. Users visually check map images, which are displayed by browsers based on map data downloaded from map servers of the map provision sites.

With this kind of map images downloaded through the map provision sites, arrow icons are provided around them. When a user clicks the arrow icon, the browser downloads from the map server a map data showing an area adjacent to the currently displayed area of map. And then the browser displays the area based on the downloaded map data.

In this case, when a user wants to visually check the vicinity of the currently displayed map image, he/she has to click the arrow icon and scroll the displayed map image. For example, when a user is trying to find out a building on maps, he/she generally does not know exactly where it is while he/she can guess. In this case, the user estimates the location of the building, and downloads a map data including the estimated location by using the browser. The user then scrolls the map image displayed on a display section a couple of times to find out the building.

By the way, a map information display device is provided capable of displaying a map image with a plurality of images showing its vicinity map. The images showing the vicinity map are displayed on the right area of the map image in thumbnail format. That allows users to visually check the vicinity (see, for example Japanese Patent Publication No. 11-120335).

SUMMARY OF THE INVENTION

In the above-noted map provision sites, there is a problem that users have to perform troublesome operations, such as downloading a map data including his/her estimated location by using the browser, displaying the map image based on the downloaded map data on the display section, and scrolling the map image a couple of times to find out the building.

With the above-noted patent document 1, the images showing the vicinity map are displayed on the right area of the map image in thumbnail format. In this case, it is difficult for a user to see how these images correspond to each direction on the map image, and that inconveniences the user.

The present invention has been made in view of the above points and is intended to provide a map display apparatus and map display method which allows a user to easily and conveniently find out destinations on maps without forcing him/her to perform troublesome operations.

According to an embodiment of the present invention, an apparatus displays a map image showing a current position at substantially a center of a screen, and disposes a plurality of vicinity map images around the map image in thumbnail format such that each vicinity map image corresponds to each direction on the map image. In this manner, the apparatus displays the vicinity map images in thumbnail format around the map image showing the current position, such that each vicinity map image corresponds to each direction on the map image disposed at substantially the center of the screen. Accordingly, the apparatus can show a user the area surrounding the area shown by the map image through the wide-area vicinity map images displayed in thumbnail format, without forcing him/her to perform screen-switching operation of switching the map image.

In this manner, the apparatus displays the map image showing the current position at substantially the center of the screen, and disposes the plurality of vicinity map images around the map image in thumbnail format such that each vicinity map image corresponds to each direction on the map image. In this way, the apparatus displays the vicinity map images in thumbnail format around the map image showing the current position, such that each vicinity map image corresponds to each direction on the map image disposed at substantially the center of the screen. Accordingly, the apparatus can show a user the area surrounding the area shown by the map image through the wide-area vicinity map images displayed in thumbnail format, without forcing him/her to perform screen-switching operation of switching the map image. Therefore, according to an embodiment of the present invention, there is provided a map display apparatus and map display method which allows a user to easily and conveniently find out destinations on maps without forcing him/her to perform troublesome operations.

The nature, principle and utility of the invention will become more apparent from the following detailed description when read in conjunction with the accompanying drawings in which like parts are designated by like reference numerals or characters.

DETAILED DESCRIPTION OF THE EMBODIMENTS

An embodiment of the present invention will be described in detail with reference to the accompanying drawings.

(1) Configuration of Vehicle Navigation System

Figure 1:
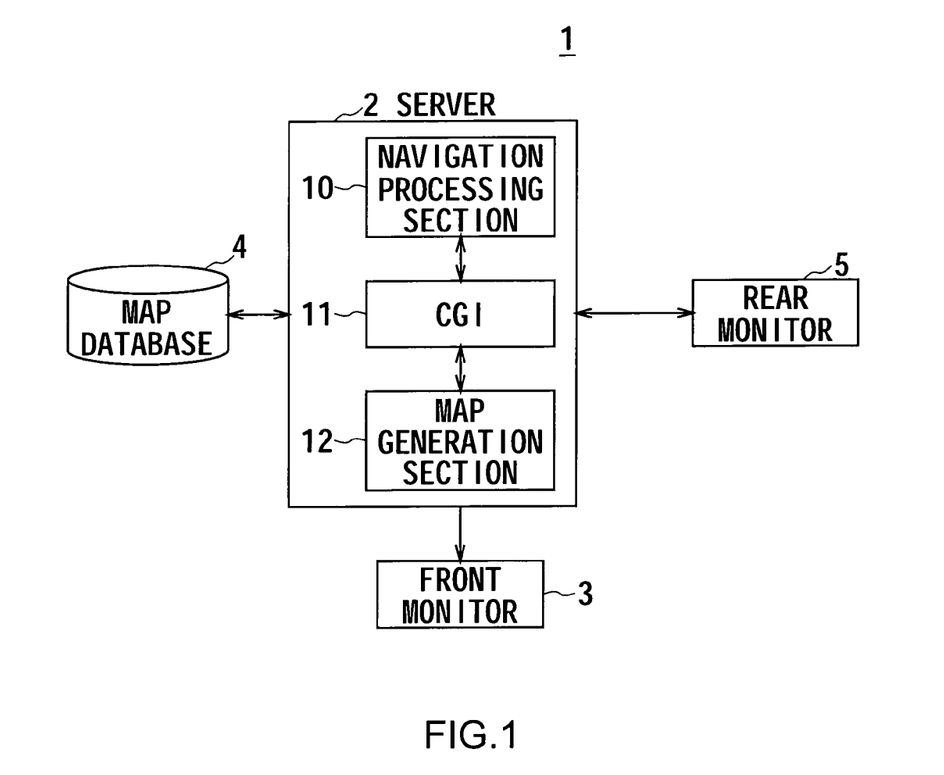
FIG. 1 is a schematic diagram showing the overall configuration of a vehicle navigation system.

With reference to FIG. 1, the reference numeral 1 denotes a vehicle navigation system in accordance with an embodiment of the present invention. The vehicle navigation system 1 includes a server 2, a front monitor 3 connected to the server 2, a map database 4 and a rear monitor 5.

The server 2 is equipped with a CPU. The server 2 includes a navigation processing section 11, a Common Gateway Interface (CGI) 11, and a map generation section 12. The navigation processing section 11 performs normal navigation processes. The CGI 11 runs a map display program stored in a hard disk when accessed by the front monitor 3 or the rear monitor 5, and then controls data communication between the front monitor 3 and the map database 4, or the rear monitor 5 and the map database 4. The map generation section 12 performs map generation processes, such as changing the display dimensions of a map data acquired via the CGI 11 from the map database 4 to fit them on the screen dimensions of the front monitor 3 or the rear monitor 5.

In the vehicle navigation system 1, the server 2, the front monitor 3 and the map database 4 are integrated and disposed in a front-seat console box. The rear monitor 5 is attached to the rear-seat ceiling.

The configuration of the front monitor 3 and rear monitor 5 will be described hereinafter. However, in this case, the circuit configuration of the front monitor 3 is the same as that of the rear monitor 5. Therefore, description about the front monitor 3 will be omitted, while the rear monitor 5 will be described.

Figure 2:
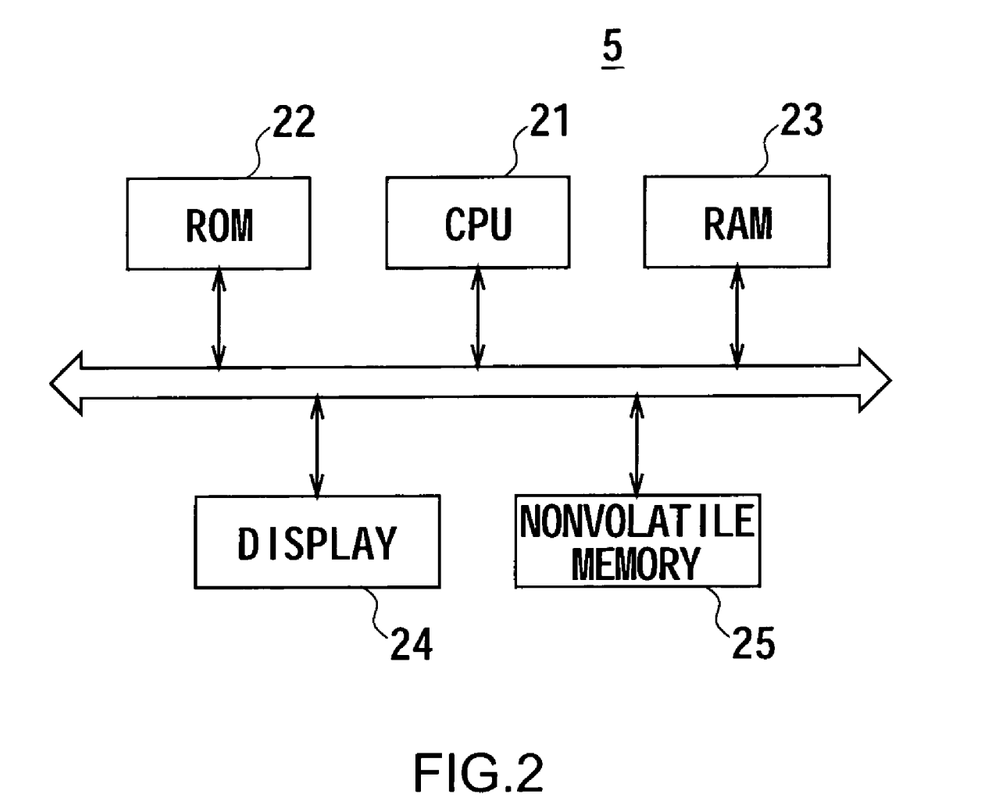
FIG. 2 is a schematic block diagram showing the circuit configuration of a rear monitor.

As shown in FIG. 2, the rear monitor 5 includes a Central Processing Unit (CPU) 21, a Read Only Memory (ROM) 22, and a Random Access Memory (RAM) 23. The CPU 21 takes overall control of the monitor 5. The rear monitor 5 also includes a display 24 and a nonvolatile memory 25. The display 24 displays navigation processing results, maps, and the like. The nonvolatile memory 25 stores and retains RAM's data when the rear monitor 5 is not powered.

When a user in the rear-seat tries to confirm the vicinity map of his/her destination using the rear monitor 5 while a driver in the driver-seat is performing usual navigation operation on the front monitor 3, the vehicle navigation system 1 in accordance with the present embodiment runs application programs stored in the ROM 22 to go from a normal navigation map image display mode into a thumbnail-attached map image display mode. That allows the rear monitor 5 to display thumbnail-attached maps (described below), which include thumbnails showing the vicinity of his/her destination.

(2) Thumbnail-Attached Map Images

After entering into the thumbnail-attached map image display mode from the normal navigation map image display mode, the front monitor 3 and the rear monitor 5 requests the server 2 to acquire thumbnail-attached map images. In response to the request, the server 2 reads out map data from the map database 4, and generates the thumbnail-attached map image 20, 30 or 50 (FIG. 3, FIG. 4 and FIG. 5, for example) based on the map data. The server 2 then displays the thumbnail-attached map image 20, 30 or 50 on the front monitor 3 and the rear monitor 5.

Figure 3:
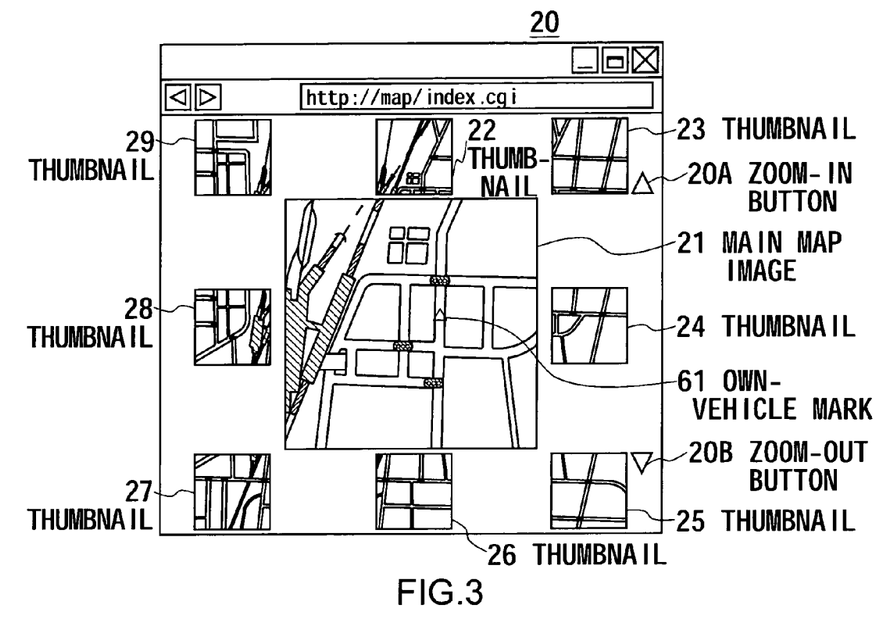
FIGS. 3 to 5 are schematic diagrams showing thumbnail-attached map images.
Figure 4:
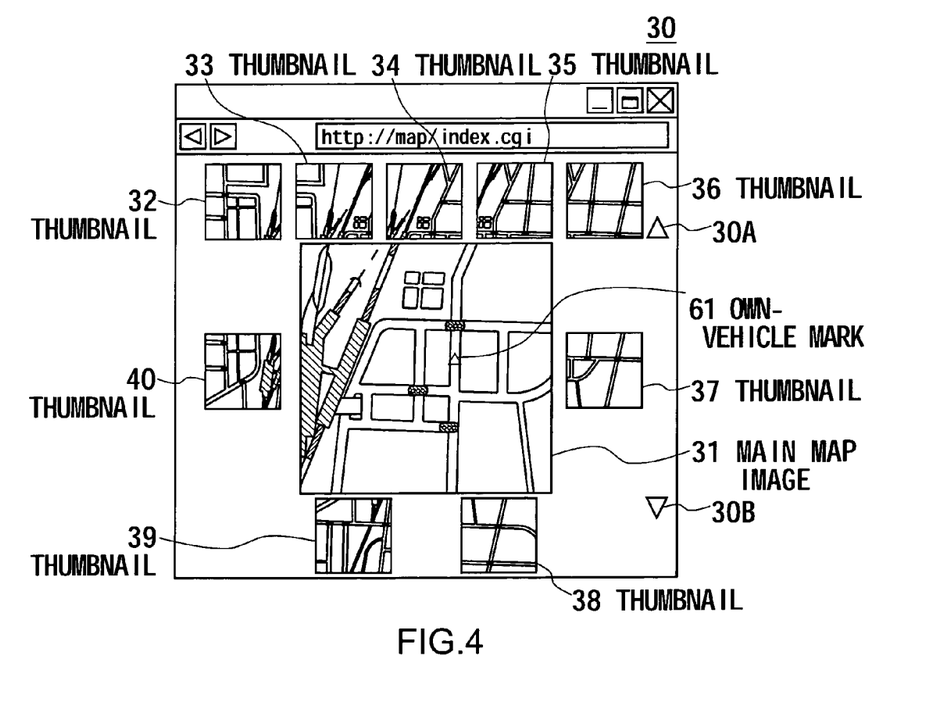
Figure 5:
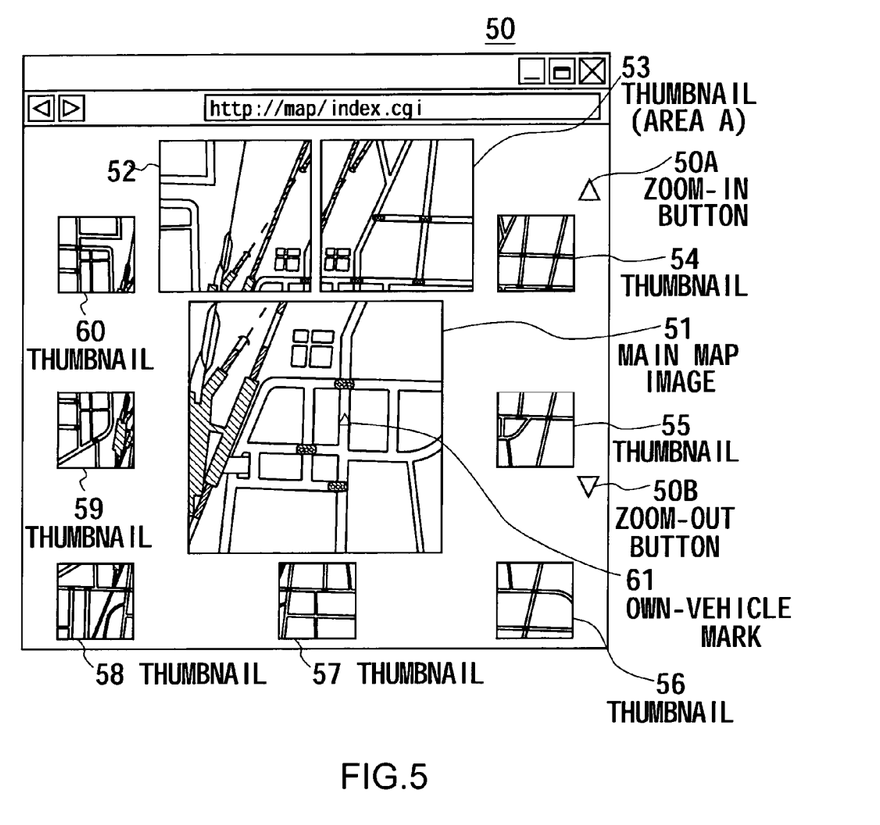

In response to requests from the front monitor 3 or the rear monitor 5, the server 2 provides one of the thumbnail-attached map images 20, 30 and 50 to the front monitor 2 or the rear monitor 5, so that the front monitor 3 or the rear monitor 5 switches the displayed map. That allows a user to select his/her desired formatted map from the thumbnail-attached map images 20, 30 and 50.

With the thumbnail-attached map image 20 shown in FIG. 3, a main map image 21 which shows an area including a user's current position is displayed on the center of the image 20. A plurality of thumbnails 22 through 29 showing the vicinity of the main map image 21 is displayed around the main map image 21.

The thumbnail 22 is a map showing a certain area that is located above the area of main map image 21 including the current position, which is to say the thumbnail 22 shows an area located in the traveling direction. The thumbnail 23 is a map showing a certain area that is located on the upper right side of the area of main map image 21 including the current position. The thumbnail 24 is a map showing a certain area that is located on the right side of the area of main map image 21 including the current position.

That is to say, the thumbnails 22 through 29 are maps, and each of which shows a certain area located in each direction of the main map image 21. The dimensions of each thumbnail 22 through 29 are reduced in comparison with the main map image 21. The thumbnails 22 through 29 are displayed around the main map image 21 showing the user's current position.

Accordingly, when seeing the thumbnail-attached map image 20, a user can visually check the thumbnails 22 through 29 corresponding to all directions of the main map image 21, as well as the main map image 21 that is usually used by the normal navigation process. That allows the user to see map information about a wider area than the area shown by the main map image 21.

In this manner, the user can visually check the main map image 21 and thumbnails 22 through 29 on the same screen. That allows the user to see the area not shown by the main map image 21 without performing scroll operation, screen-switching operation and the like.

In the thumbnail-attached map image 20, a zoom-in button 20A and a zoom-out button 20B are disposed on the right area of the screen. The displayed main map image 21 is zoomed in or out by a certain magnification each time when the zoom-in button 20A or the zoom-out button 20B is clicked. In response to that, the displayed thumbnails 22 through 29 are also zoomed in or out by a certain magnification.

With the thumbnail-attached map image 30 shown in FIG. 4, a main map image 31 which shows an area including a user's current position is displayed on the center of the image 30. A plurality of thumbnails 32 through 40 showing the vicinity of the main map image 31 is displayed around the main map image 31.

In this case, the thumbnails 32 through 36 are maps, and each of which shows a certain area located in the traveling direction with reference to the main map image 31 including the current position. Each thumbnail 32 through 36 is set to display slightly different area of map.

The thumbnail 37 is a map showing a certain area that is located on the right side of the area of main map image 31 including the current position. The thumbnail 40 is a map showing a certain area that is located on the left side of the area of main map image 31 including the current position. The thumbnail 38 is a map showing a certain area that is located on the back right side of the area of main map image 31 including the current position. The thumbnail 39 is a map showing a certain area that is located on the back left side of the area of main map image 31 including the current position.

In the thumbnail-attached map image 30 described above, the plurality of thumbnails 32 through 36 is disposed in the traveling direction of the own-vehicle. The plurality of thumbnails 38 and 39 is disposed in the backward direction of the own-vehicle. Therefore, the amount of visual information about the traveling direction or the backward direction increases, when an own-vehicle mark 61 indicating the traveling direction becomes a heading-up state in which the own-vehicle mark 61 is always pointing upward. That allows the user to visually check the destination-vicinity map of the traveling direction or backward direction of the own-vehicle more easily.

In the thumbnail-attached map image 30, a zoom-in button 30A and a zoom-out button 30B are disposed on the right area of the screen. The displayed main map image 31 is zoomed in or out by a certain magnification each time when the zoom-in button 30A or the zoom-out button 30B is clicked. In response to that, the displayed thumbnails 32 through 40 are also zoomed in or out by a certain magnification.

With the thumbnail-attached map image 50 shown in FIG. 5, a main map image 51 which shows an area including a user's current position is displayed on the center of the image 50. A plurality of thumbnails 52 through 60 showing the vicinity of the main map image 51 is displayed around the main map image 51.

In this case, the thumbnails 52 and 53 are maps, and each of which shows a certain area located in the traveling direction with reference to the main map image 51 including the current position. Each thumbnail 52 and 53 is set to display slightly different area of map. And the thumbnails 52 and 53 are displayed in larger size than the other thumbnails 54 through 60 to improve visibility.

The thumbnails 54 through 60 are similar to the thumbnails 23 through 29 of the thumbnail-attached map image 20 shown in FIG. 3. That is to say, the thumbnails 54 through 60 are maps showing areas located in the other directions with reference to the main map image 51 including the user's current position.

In the thumbnail-attached map image 50 described above, especially the thumbnails 52 and 53, disposed in the traveling direction of the own-vehicle, are displayed in larger size than the other thumbnails 54 through 60. Therefore, when an own-vehicle mark 61 indicating the traveling direction becomes the heading-up state in which the own-vehicle mark 61 is always pointing upward, the user can visually check the certain area of destination-vicinity map in the traveling direction more easily.

In the thumbnail-attached map image 50, a zoom-in button 50A and a zoom-out button 50B are disposed on the right area of the screen. The displayed main map image 51 is zoomed in or out by a certain magnification each time when the zoom-in button 50A or the zoom-out button 50B is clicked. In response to that, the displayed thumbnails 52 through 60 are also zoomed in or out by a certain magnification.

(3) Thumbnail-Attached Map Image Update Process

Figure 6:
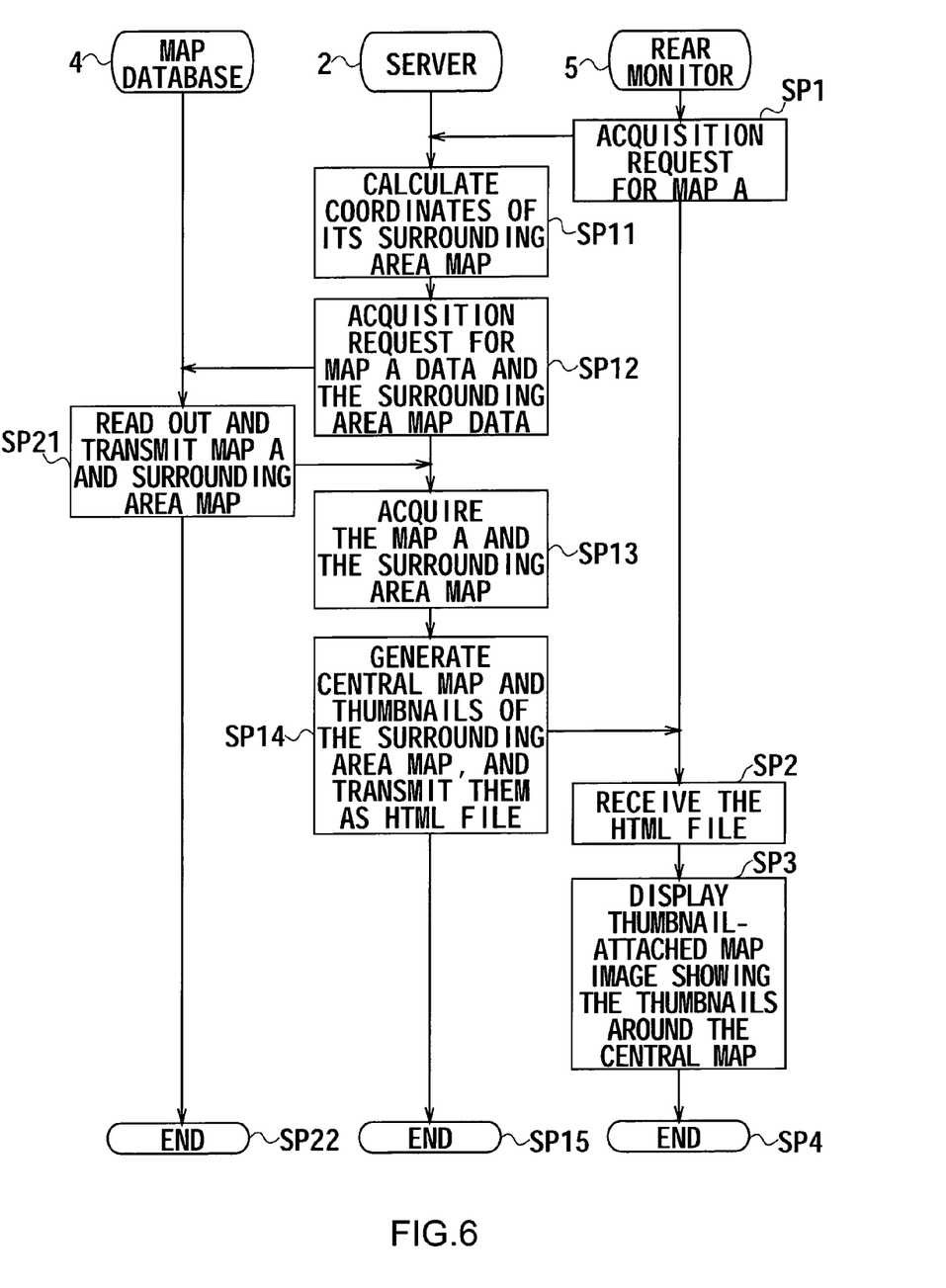
FIG. 6 is a flowchart showing a thumbnail-attached map image update process.

With reference to a flowchart shown in FIG. 6, a thumbnail-attached map image update process will be described hereinafter. In this case, the thumbnail-attached map image update process described below changes and updates the map contents of main map image 21, 31 and 51 displayed in the above-noted thumbnail-attached map image 20, 30 and 50 on the rear monitor 5, in response to thumbnail-selection operation.

At step SP1, for example, when a user clicks the thumbnail 53 during the time the rear monitor 5 is displaying the thumbnail-attached map image 50 (FIG. 5) in the thumbnail-attached map image display mode (not the normal navigation map image display mode), the rear monitor 5 transmits to the server 2 an acquisition request for a map A, and then proceeds to next step SP2. In this case, the map A is the one showing an area A of the thumbnail 53.

At this time, the rear monitor 5 transmits to the server 2 an attribute data associated with the map A, along with the acquisition request for the map A. This attribute data includes a longitude and latitude of the center of the map A, and a display scale information about the main map image 51 and thumbnails 52 through 60 currently displayed on the rear monitor 5.

At step SP11, the server 2 calculates longitudes and latitudes of a certain area surrounding the area of the map A requested by the rear monitor 5. In this case, a map of the surrounding area will become thumbnails. The server 2 then proceeds to next step SP12.

At step SP12, the server 2 transmits to the map database 4 longitude-latitude information about the map A and map of the surrounding area (the map of the surrounding area will become thumbnails). In this manner, the server 2 requests the map A and the map that will be thumbnails from the map database 4, and then proceeds to next step SP13.

In response to the request from the server 2, the map database 4 at step SP21 reads out map data of the map A and map of the surrounding area (the map of the surrounding area will become thumbnails) from a hard disk, and then transmits them to the server 2. The map database 4 subsequently proceeds to next step SP22 to end the process.

The server 2 at step SP13 acquires from the map database 4 the map data of the map A and map of the surrounding area (the map of the surrounding area will become thumbnails), and then proceeds to next step SP14.

At step SP14, the server 2 converts the map data of the map A into a central map A data, the central map A data having suitable dimensions for being displayed as the main map image 51 with reference to the dimensions of the rear monitor 5. The server 2 also changes the dimensions of the map data that will be thumbnails based on the display scale information of thumbnails 52 through 60, and performs image compression for them to generate a plurality of thumbnail data in Graphics Interchange Format (GIF) or Joint Photographic Experts Group (JPEG) format. And then the server 2 embeds the central map A data and these thumbnail data within a Hyper Transfer Markup Language (HTML) file, and transmits the HTML file to the rear monitor 5. The server 2 subsequently proceeds to step SP15 to end the process.

The rear monitor 5 at step SP2 receives the HTML file including the central map A data and the plurality of thumbnail data, and then proceeds to next step SP3.

At step SP3, based on the HTML file received from the server 2, the rear monitor 5 displays a central map A corresponding to the central map A data as the main map image 51. In this case, the central map A has suitable dimensions for being displayed on the rear monitor 5. The rear monitor 5 also displays the plurality of thumbnails 52 through 60 around the main map image 51. In this manner, the rear monitor 5 updates the displayed contents. Then, the rear monitor 5 proceeds to next step SP4 to end the process.

As described above, when a user clicks the thumbnail 53 of the thumbnail-attached map image 50 displayed on the rear monitor 5, the vehicle navigation system 1 performs update processes and displays the central map A showing the area of the clicked thumbnail 53 as the main map image 51. In response to that, the vehicle navigation system 1 also updates the thumbnails 52 through 60 such that the thumbnails 52 through 60 display the vicinity of the central map A.

(4) Operation and Effect

In the above-noted configuration, the server 2 of the vehicle navigation system 1 displays the thumbnail-attached map image 20, 30 or 50 on the front monitor 3 and the rear monitor 5. Therefore, a user can visually check the main map image 21, 31 or 51 and the thumbnails 22 through 29, 32 through 40 or 52 through 60 on the same screen at the same time. In this case, the main map image 21, 31 or 51 is disposed in the middle of the thumbnails 22 through 29, 32 through 40 or 52 through 60. The thumbnails 22 through 29, 32 through 40 or 52 through 60 show the vicinity of the main map image 21, 31 or 51 in all directions. That allows the user to see map information about a wider area than the main map image 21, 31 or 51.

Accordingly, the user can find out the place not shown in the main map image 21, 31 or 51 by watching the thumbnails 22 through 29, 32 through 40 or 52 through 60, without performing scroll operation, screen-switching operation and the like.

In addition, the rear monitor 5 displays the thumbnails 22 through 29, 32 through 40 or 52 through 60 around the main map image 21, 31 or 51 on the thumbnail-attached map image 20, 30 or 50. In this case, the main map image 21, 31 or 51 is disposed in the middle of thumbnails 22 through 29, 32 through 40 or 52 through 60, and each thumbnail 22 through 29, 32 through 40 or 52 through 60 corresponds to each direction on the main map image 21, 31 or 51. Therefore, the user can intuitively recognize that the layout position of the thumbnails 22 through 29, 32 through 40 or 52 through 60 indicates directions from the current position. Accordingly, the user can easily find out his/her destination on the map.

In addition, the rear monitor 5 performs the thumbnail-attached map image update process (FIG. 6) via the server 2. Therefore, when the user just clicks his/her desired thumbnail 53, the rear monitor 5 immediately updates and displays the main map image 51 such that the main map image 51 shows the central map A, which shows the area of the clicked thumbnail 53. At this time, the rear monitor 5 also updates and displays the thumbnails 52 through 60 such that the thumbnails 52 through 60 show map information about the area surrounding the central map A.

In addition, the server 2 reduces the dimensions of images in comparison with the main map image 51 and performs image compression to generate the thumbnails 52 through 60. Therefore, in comparison with the situation in which the server 2 provides map images to the rear monitor 5 in the normal navigation map image display mode, the server 2 in the thumbnail-attached map image display mode can reduce the amount of communication data, since it provides the size-reduced thumbnail-attached map image 50.

In addition, the server 2 transmits to the rear monitor 5 the central map A data (the main map image 51) acquired from the map database 4 and the plurality of thumbnail data by using the HTML file. Therefore, the rear monitor 5 does not have to perform generation process to generate the thumbnail-attached map image 50. That reduces the processing load of the rear monitor 5.

According to the above-noted configuration, the vehicle navigation system 1 allows the user to easily find out his/her destination on the map displayed on the front monitor 3 or the rear monitor 5, without forcing the user to perform troublesome operations.

(5) Other Embodiments

In the above-noted configuration, when the user clicks the thumbnail 53 of the thumbnail-attached map image 50, the rear monitor 5 for example performs update process to display the area of the thumbnail 53 as the main map image 51. Also the rear monitor 5 updates the displayed thumbnails 52 through 60 accordingly. However, the present invention is not limited to that. For example, when the current position is moving, the rear monitor 5 may update and display map contents of the thumbnails 52 through 60 accordingly, as well as updating and displaying the main map image 51 accordingly.

In the above-noted embodiment, the rear monitor 5 displays the thumbnail-attached map image 20, 30 or 50. However, the present invention is not limited to that. The front monitor 3 may display the thumbnail-attached map image 20, 30 or 50.

In the above-noted embodiment, the thumbnails 52 and 53, displayed in larger size than the other thumbnails 54 through 60, are disposed in the traveling direction of own-vehicle mark 61 on the thumbnail-attached map image 50 to improve the visibility of map information regarding the traveling direction. However, the present invention is not limited to that. For example, when the own-vehicle mark 61 is not in the heading-up state and is changing its direction from right to left or up and down, the enlarged thumbnails could be disposed accordingly.

In the above-noted embodiment, the server 2 follows the map display program to generate the HTML file including the above-mentioned thumbnail-attached map image 20, 30 or 50. However, the present invention is not limited to that. The server 2 may follow the map display program that was installed from a storage medium containing it to generate the HTML file including the above-mentioned thumbnail-attached map image 20, 30 or 50.

In the above-noted embodiment, the server 2 is provided separately from the front monitor 3 and the rear monitor 5. However, the present invention is not limited to that. For example, the server 2 and the front monitor 3, or the server 2 and the rear monitor 5 could be integrated into one unit. In this case, the front monitor 3 or the rear monitor 5 may display the main map image 21, 31 or 51 generated by the map generation section 12 of the server 2, and dispose the thumbnails 22 through 29, 32 through 40 or 52 through 60 around it.

In addition, the vehicle navigation system 1 is applied to an embodiment of the present invention. However, the present invention is not limited to that. A server and client system including personal computers and mobile phones also could be applied to an embodiment of the present invention.

In the above-noted embodiment, a map image display means and vicinity map image disposition means are realized by executing software (the map display program) by the CPU 21 and the RAM 23. However, the present invention is not limited to that. The map image display means and vicinity map image disposition means could be realized by hardware such as various kinds of circuits.

The map display apparatus and map display method according to an embodiment of the present invention can be utilized to find out destinations from the area not shown in the map image that shows a current position, for example.

It should be understood by those skilled in the art that various modifications, combinations, sub-combinations and alterations may occur depending on design requirements and other factors insofar as they are within the scope of the appended claims or the equivalents thereof.

What is claimed is:

1. A map display apparatus comprising:
   map image display means for displaying a map image showing a current position at substantially a center of a screen; and
   vicinity map image disposition means for disposing a plurality of vicinity map images around said map image in thumbnail format such that each vicinity map image corresponds to each direction on said map image, one or more of the plurality of vicinity map images located in a traveling direction being displayed in larger size relative to other vicinity map images.

2. The map display apparatus according to claim 1, wherein said vicinity map image disposition means disposes more vicinity map images in a traveling direction of an own-vehicle mark on said map image than those in other directions.

3. The map display apparatus according to claim 1, wherein said vicinity map image disposition means displays said vicinity map images in a traveling direction of an own-vehicle mark on said map image in larger size than those in other directions.

4. The map display apparatus according to claim 1, wherein when said map image display means displays said map image in large or small size in response to a user instruction, said vicinity map image disposition means displays said vicinity map images in large or small size in response to said map image.

5. The map display apparatus according to claim 1, wherein:
   when one of said plurality of vicinity map images is selected, said map image display means updates said map image disposed at substantially the center of said screen such that said map image shows map contents of the selected vicinity map image, and displays the updated map image; and
   said vicinity map image disposition means updates map contents of said vicinity map images in response to said updated map image, and displays the updated vicinity map images.

6. The map display apparatus according to claim 1, wherein when said map image display means updates contents of said map image in response to a movement of a current position, said vicinity map image disposition means updates contents of said vicinity map images in response to the movement of said current position.

7. A map display method comprising:
   displaying a map image showing a current position at substantially a center of a screen; and
   disposing a plurality of vicinity map images around said map image in thumbnail format such that each vicinity map image corresponds to each direction on said map image one or more of the plurality of vicinity map images located in a traveling direction being displayed in larger size relative to other vicinity map images.

8. A map display program recorded on a computer readable medium for causing information processing apparatus to execute:
   displaying a map image showing a current position at substantially a center of a screen; and
   disposing a plurality of vicinity map images around said map image in thumbnail format such that each vicinity map image corresponds to each direction on said map image one or more of the plurality of vicinity map images located in a traveling direction being displayed in larger size relative to other vicinity map images.

9. A vehicle equipped with a map display apparatus, said map display apparatus comprising:
   map image display means for displaying a map image showing a current position at substantially a center of a screen; and
   vicinity map image disposition means for disposing a plurality of vicinity map images around said map image in thumbnail format such that each vicinity map image corresponds to each direction on said map image, one or more of the plurality of vicinity map images located in a traveling direction being displayed in larger size relative to other vicinity map images.

10. A map display apparatus comprising:
   a map image display section for displaying a map image showing a current position at substantially a center of a screen; and
   a vicinity map image disposition section for disposing a plurality of vicinity map images around said map image in thumbnail format such that each vicinity map image corresponds to each direction on said map image one or more of the plurality of vicinity map images located in a traveling direction being displayed in larger size relative to other vicinity map images.

* * * * *